F. I. & B. P. REMY & A. BERGER.
DRIVING AND STEERING DEVICE FOR MOTOR VEHICLES.
APPLICATION FILED JAN. 9, 1914.

1,128,818.

Patented Feb. 16, 1915.

WITNESSES:
A H Edgerton
O M McLaughlin

INVENTORS
Frank I. Remy,
Benjamin P. Remy &
Arthur Berger.
BY
V H Lockwood
ATTORNEY

UNITED STATES PATENT OFFICE.

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

DRIVING AND STEERING DEVICE FOR MOTOR-VEHICLES.

1,128,818.   Specification of Letters Patent.   Patented Feb. 16, 1915.

Application filed January 9, 1914. Serial No. 811,176.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Driving and Steering Device for Motor-Vehicles; and we do hereby declare that the following is a full, clear, and exact description thereof, reference being had to the accompanying drawings, in which like letters refer to like parts.

The object of this invention is to steer vehicles, the traction wheels of which are driven by differential gearing mechanism, such steering means consisting of another differential mechanism for applying power to the traction wheels, and means for controlling the operation of said differential gear so as to start, stop or reverse said steering differential gear.

In carrying out said invention, two sets of differential gearing are provided, one primarily for driving the traction wheels and the other primarily for steering the same, and there is also provided means such as friction transmission for starting, stopping and reversing the latter differential steering mechanism. This enables one to operate the vehicle straight without any operation of the steering differential gear and when one wants to turn, he can start the steering differential gearing in either direction so as to make one wheel travel faster than the other.

The nature of the invention will be understood from the accompanying drawings and the following description and claims.

Figure 1:
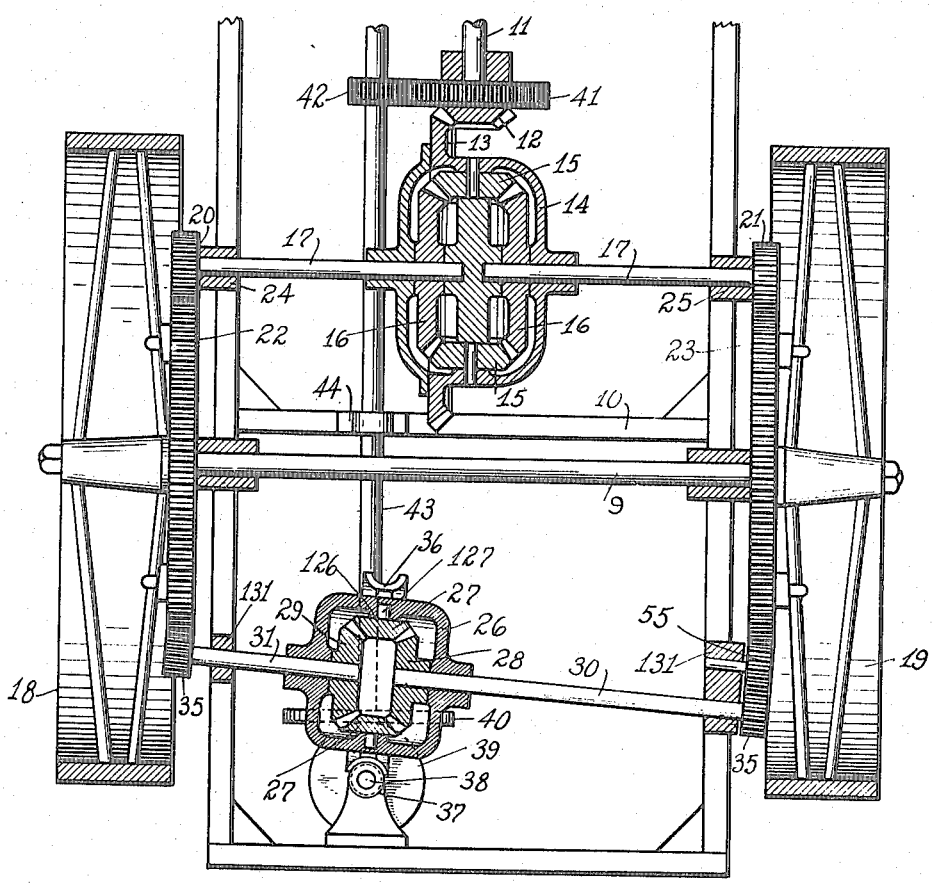
Figure 2:
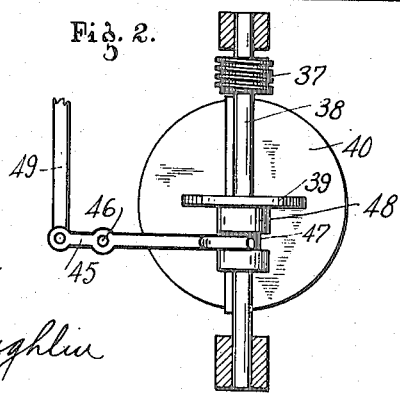

In the drawings, Figure 1 is a plan view of the machine with the differential mechanism and other parts in horizontal section and parts being broken away. Fig. 2 is a plan view of the means for adjusting the friction clutch mechanism.

There is shown herein a main frame 10 carried by an axle 9 which in turn has mounted on it traction-wheels 18 and 19.

Power from any suitable motor or source comes through the drive shaft 11 to a beveled gear 12 which meshes with a beveled gear 13 which is securely fastened to the differential housing 14. The differential or equalizing gear consists of pinions 15 and gears 16. The latter gears are secured to shafts 17 mounted in the frame and in alinement with each other and which have secured on their outer ends master pinions 20 and 21. These pinions mesh with master gears 22 and 23 which are secured to the traction wheels 18 and 19 of the vehicle. The shafts 17 are mounted in bearings 24 and 25. The foregoing mechanism is an ordinary construction found in automobiles which use a jack shaft.

The steering mechanism consists of a second equalizing gear in a housing 26. In this housing there are pinions 27 and gears 28 and 29. The latter gears are secured on the shafts 30 and 31, respectively, which are mounted in the frame 10 in suitable bearings 131. The shaft 31 has secured on its outer end a pinion 35 which meshes with the master gear 22. The shaft 30 carries on its outer end a pinion 35 which meshes with an intermediate gear 55 and that in turn meshes with the master gear 23. The beveled gears 27 are secured on a shaft 127, the ends of which are mounted in bearings 126 located in the inner surface of the housing 26 and on opposite sides thereof, as shown in Fig. 1, and so that the gears 27 are always in mesh with the gears 28 and 29. This will cause the shafts 30 and 31 to be driven simultaneously, but in opposite directions, but because of the intermediate pinion 55 they will drive the master gears 22 and 23 in the same direction.

Around the housing 26 there is a worm gear 36 which meshes with a worm 37 on a vertical shaft 38 which is mounted in bearings secured to the main frame. On the shaft 38 there is a vertical slidable friction wheel 39 splined and it is in frictional engagement with a vertically disposed friction disk 40 secured on a shaft 43 which is driven from the driving shaft 11 by gears 41 and 42 mounted in bearings 44 depending from the main frame. The friction wheel 39 is vertically adjusted with reference to the friction disk 30 by a lever 45 which is fulcrumed between its ends to the frame at 46 and has a yoked inner end fitting in a circular groove 47 in a hub 48 of the wheel 39. The lever 45 is actuated by a bar 49 through means not here shown.

The operation of the machine is as follows: The main driving means is the same as that used in automobile jack shaft transmissions. In steering, the vehicle will be driven straight ahead when the velocities of the traction wheels 18 and 19 are equal and in that event the shafts 30 and 31 are driven at equal velocities. Since these shafts 30 and 31 run with equal speed, the pinions 27 operate without a reaction of the housing 26 so that the housing 26 does not rotate. If, however, the housing 26 is caused to rotate by means of the friction gearing above described, the speed of the shafts 30 and 31 are made unequal and this imparts unequal speed to the master gears 22 and 23 and the wheels 18 and 19 and that causes them to turn due to the fact that the traction wheels are not covering the same amount of ground in the same time. This unequalness in the velocities of the traction wheels is taken care of by the main equalizing gear in the housing 14. In order to rotate the housing 26, the lever 45 is operated to adjust the friction wheel 39 on the friction disk 40. When they are in central position relative to each other, there will be no motion imparted to the shaft 38, but as the friction wheel 39 is moved away from the center of the friction disk 40, motion will be imparted and the speed of the housing 26 will be according to the distance the friction wheel 39 is from the center of the friction disk 40. And the direction of turning is determined by moving the friction wheel 39 either above or below the center of the disk 40. That reverses the movement of the disk 40 and, therefore, the rotation of the housing 26. Hence, the direction of turning and also the quickness of the turn is regulated by vertical adjustment of the friction wheel 39.

The term "differential gear" as herein used is meant to include any form of equalizing gear whether of a tooth construction or otherwise that performs substantially the same function as that set forth herein.

The invention is:

1. In a vehicle having a pair of traction wheels, and differential gear controlled means for driving the same, of steering means consisting of another differential gear mechanism for applying power to said wheels, and means for controlling the operation of said steering differential gear so as to vary the speed of said wheels.

2. In a vehicle having a pair of traction wheels, and differential gear controlled means for driving the same, of steering means consisting of another differential gear mechanism for applying power to said wheels, and means for starting, stopping and reversing said steering differential gear.

3. In a vehicle having a pair of traction wheels, and differential gear controlled means for driving the same, of steering means consisting of a shaft for applying power to each traction wheel, another differential gear mechanism for driving said shafts, and means for controlling said steering differential gear so as to start, stop and vary the speeds of said shafts.

4. In a vehicle, a pair of traction wheels, master gears secured thereto, two sets of differential gearing for driving said master gears in the same direction, means for driving both sets of differential gearing, and means for controlling one set of differential gearing so as to vary the speeds of said master gears and traction wheels for steering the vehicle.

5. In a vehicle, a pair of traction wheels, master gears secured thereto, two sets of differential gearing for driving said master gears in the same direction, a common means for driving both sets of differential gearing, and means for controlling one set of differential gearing so as to vary the speeds of said master gears and traction wheels for steering the vehicle.

6. In a vehicle, a pair of traction wheels, master gears secured thereto, two sets of differential gearing for driving said master gears in the same direction, means for directly driving one set of differential gearing, and controllable means for driving the other set of differential gearing.

7. In a vehicle, a pair of traction wheels, master gears secured thereto, two sets of differential gearing for driving said master gears in the same direction, means for directly driving one set of differential gearing, means actuated by said direct driving means for driving the other set of differential gearing, and means for controlling the speed of said last mentioned differential gearing.

8. In a vehicle, a pair of traction wheels, master gears secured thereto, two sets of differential gearing for driving said master gears in the same direction, means for directly driving one set of differential gearing, a shaft for driving the other set of differential gearing, a friction disk on said shaft, a worm gear on the housing of said last-mentioned differential gear, a shaft provided with a worm meshing with said worm gear, and an adjustable friction wheel splined on said worm shaft in frictional engagement with said friction disk.

9. In a vehicle, a pair of traction wheels, master gears secured thereto, two sets of differential gearing for driving said master gears in the same direction, means for directly driving one set of differential gearing, a shaft for driving the other set of differential gearing, a friction disk on said shaft, a worm gear on the housing of said last-mentioned differential gear, a shaft provided with a worm meshing with said worm gear, a friction wheel splined on said worm shaft in frictional engagement with said friction disk, and means for moving said friction wheel across the base of the friction disk for changing the direction or speed of said differential gearing for steering the vehicle.

10. In a vehicle having a pair of traction wheels, differential gear controlled means for driving the same, steering means consisting of another differential gear mechanism for applying power to said wheels, and means for controlling the operation of said steering differential gear, so as to vary the relative speed of said wheels.

11. In a vehicle having a pair of traction wheels, differential gear controlled means for driving the same, steering means consisting of a shaft for applying power to each traction wheel, another differential gear mechanism for driving said shafts, and means for controlling said steering differential gear so as to start, stop, reverse, and vary the relative speeds of said shafts.

12. In a vehicle, a pair of traction wheels, master gears secured thereto, two sets of differential gearing for driving said master gears in the same direction, means for driving both sets of differential gearing, and means for controlling one set of differential gearing, so as to vary the relative speeds of said master gears and traction wheels for steering the vehicle.

In witness whereof, we have hereunto affixed our signatures in the presence of the witnesses herein named.

FRANK I. REMY.
  BENJAMIN P. REMY.
  ARTHUR BERGER.

Witnesses:
 RUTH I. MILLER,
 OMAR H. DAY.